US007070822B1

(12) United States Patent
Shi et al.

(10) Patent No.: US 7,070,822 B1
(45) Date of Patent: *Jul. 4, 2006

(54) POWDERED ADHESIVE FOR FOODS

(75) Inventors: Yong-Cheng Shi, Hillsborough, NJ (US); Yayun Liu, Hillsborough, NJ (US); Robert L. Billmers, Stockton, NJ (US); Russell Stoop, Glen Gardner, NJ (US); David Huang, Bound Brook, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 251 days.

This patent is subject to a terminal disclaimer.

(21) Appl. No.: 10/327,023

(22) Filed: Dec. 20, 2002

(51) Int. Cl.
*A23L 1/09* (2006.01)

(52) U.S. Cl. .................. 426/289; 426/658

(58) Field of Classification Search ............... 426/89, 426/661, 274, 285
See application file for complete search history.

(56) References Cited

U.S. PATENT DOCUMENTS

| 3,391,003 | A | * | 7/1968 | Dunne et al. ............... 426/285 |
| 4,543,370 | A | | 9/1985 | Porter et al. ............... 523/100 |
| 4,702,496 | A | * | 10/1987 | Hume, III ................. 281/15.1 |
| 4,738,865 | A | | 4/1988 | Morris ....................... 426/658 |
| 4,935,243 | A | * | 6/1990 | Borkan et al. .............. 424/441 |
| 4,981,707 | A | * | 1/1991 | Morris ....................... 426/93 |
| 5,298,268 | A | * | 3/1994 | Maegli ....................... 426/93 |
| 5,360,845 | A | * | 11/1994 | Billmers et al. ............ 524/51 |
| 5,362,505 | A | * | 11/1994 | Hsieh et al. ................. 426/93 |
| 5,580,601 | A | | 12/1996 | Ribadeau-Dumas et al. ..... 426/660 |
| 5,599,569 | A | * | 2/1997 | Chiu et al. ................... 426/48 |
| 5,676,944 | A | * | 10/1997 | Alvarado et al. ........ 424/93.71 |
| 5,882,707 | A | * | 3/1999 | Grillo et al. ................ 426/302 |
| 5,882,713 | A | * | 3/1999 | Eskins et al. ............... 426/578 |
| 5,962,047 | A | * | 10/1999 | Gross et al. ................. 426/48 |
| 5,972,395 | A | * | 10/1999 | Saleeb et al. ................ 426/96 |
| 6,007,614 | A | * | 12/1999 | Billmers et al. ......... 106/207.1 |
| 6,066,368 | A | * | 5/2000 | Billmers et al. ......... 427/393.4 |
| 6,090,419 | A | * | 7/2000 | Popplewell et al. .......... 426/96 |
| 6,416,799 | B1 | * | 7/2002 | Porzio et al. ................ 426/96 |
| 6,468,568 | B1 | * | 10/2002 | Leusner et al. .............. 426/72 |
| 6,495,177 | B1 | * | 12/2002 | deVries et al. ............... 426/72 |
| 6,846,502 | B1 | * | 1/2005 | Billmers et al. ............ 426/289 |

FOREIGN PATENT DOCUMENTS

| JP | 57-166943 | * 10/1982 |
| WO | WO 92/22606 | 12/1992 |

OTHER PUBLICATIONS

Stecher, Paul G. 1968. The Merck Index 8th edition., Rahway, NJ. p. 980.*
Weast, R.C. 1970. Handbook of Chemistry and Physics. The Chemical Rubber Co, Cleveland, Ohio, p. C-3-5.*

* cited by examiner

*Primary Examiner*—Carolyn Paden
(74) *Attorney, Agent, or Firm*—Ellen T. Dec; Karen G. Kaiser

(57) ABSTRACT

The present invention is directed toward a free flowing powdered blend of a polysaccharide and a crystalline polyol for use as an edible adhesive for particulate materials such as seasonings and flavorings. The powdered adhesive blend can easily be mixed with seasonings or flavorings and will melt during a heating process to a sticky viscose liquid capable of adhering seasoning particles to the food substrate. The blends of the present invention have the benefits of being easy to prepare, use and store as they will stay a free flowing powder under most ambient conditions.

8 Claims, No Drawings

POWDERED ADHESIVE FOR FOODS

BACKGROUND OF THE INVENTION

The present invention relates to a powdered food-grade blend of a polysaccharide and a crystalline polyol for adhering particulate flavors, seasonings and coloring agents to food substrate. The blend is easy to prepare and maintains its free flowing powder form at room temperature under elevated humidity, while still being able to melt and function as an adhesive on application of heat.

There are many commercial applications wherein it is desired to adhere various particulate additives, for example flavoring agents such as sugar, salt, cheese powder, spices and the like to the external surfaces of foodstuffs, such as cereal, crackers, cookies, or snack foods such as potato chips, pretzels, tortilla chips, popcorn, or nut products.

It is desirable that the adhesive used adds little or no flavor to the foodstuff. Further, the material must not only be readily applicable, but must be capable of providing strong adherence, even after the foodstuffs have been subjected to packaging, transport, and storage.

Fats and oils have traditionally been used for adhering particulate additives such as flavoring and/or coloring agents to these foodstuffs. However, as a result of recent market demand for low-fat and fat-free foodstuffs, these traditional adhesives often have been abandoned in favor of lower calorie substitutes.

These non-fat adhesives include gelatin, starch pastes, and malt syrups which have the disadvantage of decreasing adhesive forces over time such that the particulate additives tend to fall off prior to reaching the consumer or lack sufficient adhesive force such that they can only be used effectively in large quantities. Further, when using such water-based adhesives, it is necessary for the manufacturer to drive off the water after application so that the foodstuff does not absorb it and lose its crisp texture. This post-drying step not only requires additional processing time and equipment, but also introduces one more variable to control. Finally, traditional non-fat adhesives tend to be sticky due to their high ability to absorb moisture.

Recently, enzyme modified food starches have also been used as adhesives. For example, JP 56 49406 discloses the use of adhering flavoring agents to foods using a waxy starch hydrolyzed by α- and β-amylase.

Various other polysaccharide compositions are known in the art as being useful as adhesives, including those useful for adhering flavoring and/or coloring agents to foodstuffs. JP 61250090 discloses an adhesive tape or label in which pullulan is coated on one side of a releasing paper. JP 03047040 discloses an adhesive containing a polysaccharide, water, and ethanol. Chemical Abstract # 121:203917 discloses marshmallows coated with an edible adhesive material, such as gelatin, and powdered sugar. JP 61246239 discloses adhesive compositions useful for packaging which contain pullulan.

Numerous hot melts are known in the art. Typically, these hot melts are inedible, substantially water insoluble, and used as packaging adhesives. However, several edible hot melts are known: For example, JP 57158276 discloses an edible hot melt adhesive composition containing an ethylene vinyl acetate copolymer, a tackifying resin, and a paraffin wax which is useful for the manufacture of vessels for storing edible oil-containing foods. Edible hot melts are also known for use as a protective coating: for example US Defensive Publication 729,549 discloses edible hot melts containing solid monoglycerides, solid $C_2$–$C_4$ fatty acid acylated monoglycerides, or solid poly(oxyalkylene) glycerols with solid hydroxypropyl cellulose.

Although edible, none of these hot melt compositions disclose, or are even useful for, the present application of adhering particulate additives such as flavoring and/or coloring agents to foodstuffs, primarily as they are not free-flowing powders and/or do not have the ability to melt quickly at low temperatures.

The use of an edible hot melt has recently been described in U.S. application Ser. No. 08/670,885 to Billmers et al. in which a polysaccharide and a plasticizer are melted together and then formed into a dry powder. Since the formulation of this reference has been completely melted in the processing step (e.g. extrusion), it is in the amorphous state and can easily absorb moisture from the environment and form undesirable clumps. To keep the formulation as a free flowing powder anti-caking additives and waxes are utilized to over-come these drawbacks.

Surprisingly, it has now been discovered that an edible powdered blend of polysaccharides and crystalline polyols is capable of acting as an adhesive for adhering various flavorings and/or coloring agents to foodstuffs.

SUMMARY OF THE INVENTION

The instant invention is directed to a food grade powdered adhesive blend which may be prepared by simple mixing of a powdered polysaccharide and a crystalline polyol. Upon application of heat, the blend will transform into a viscose sticky liquid capable of adhering particles to the surface of a food substrate. Upon cooling, the viscose liquid solidifies and forms a strong bond between the substrate and the particles. The ability to hold the flavorings and seasonings tightly to the food substrate is extremely important to maintain the integrity of the food articles during packaging and shipping.

The adhesive blend described herein will find many applications in the food industry, but will be particularly useful in the preparation of low calorie snacks.

An object of the instant invention is to provide an edible powdered adhesive that is useful for adhering particulate additives to foodstuffs.

Another object of the instant invention is to provide a method of adhering particulate additives to foodstuffs wherein it is not necessary for the manufacturer to drive off the water added using traditional food adhesives.

These and other objects of the present invention will become apparent to one skilled in the art from the following detailed description and examples below.

DETAILED DESCRIPTION OF THE INVENTION

The present invention is directed to a food grade powdered adhesive blend, which may be prepared by simply mixing a powdered polysaccharide and a crystalline polyol. Upon application of heat, the blend will transform into a viscose sticky liquid capable of adhering particles to the surface of a food substrate. Upon cooling, the viscose liquid solidifies and forms a strong bond between the substrate and the particles. For purposes of this invention seasonings are defined as any particulate additive used to provide color, flavor or texture to a foodstuff.

The polysaccharide may be from any source and can be native or modified. Examples of suitable polysaccharides are, but not limited to carboxymethyl cellulose, methyl cellulose, hydroxypropyl cellulose, β-glucan, corn fiber gum, guar gum, locust bean gum, xanthan, carrageenan, alginate, pectin, gum arabic, and starch. For purposes of this invention the, suitable polysaccharides can also be oligiosccharides, such as fructoseoligiosaccharide (FOS), containing between about 3 and 20 sugar residues. Crystalline polysaccharides other than starch will need to be processed to render them amorphous.

When the powdered polysaccharide to be used in the instant invention is starch it may be derived from any source, including cereal or root starch or flour. Examples of suitable materials include, but are not limited to, maize, rice, barley, wheat, sorghum, tapioca, potato, the waxy versions thereof, and the corresponding flours, particularly waxy starches, more particularly waxy corn starch. Converted, i.e., acid treated starches or chemically modified starches may also be used as the starting materials.

In an embodiment of the present invention when starch is selected as the polysaccharide, the granular structure must be removed before blending with the crystalline polyol. Removal of the granular structure can be accomplished chemically, or by the addition of heat (dextrinization) or by the addition of heat and water (cooking). The granular structure may be removed before, during or after conversion or chemical modification, but must be rendered to a dry powder before blending with the crystalline polyol. Most suitable methods for cooking the starch are jet cooking and steam cooking.

Jet cooking, as used herein, refers to slurrying the starch and heating the slurry to a temperature of from about 120° C. to about 170° C., in order to gelatinize substantially all of the starch. The steam cooking is generally carried out on a starch slurry at a solids level of from about 10 to about 40%, particularly from about 20 to about 25% and a pH from about 4 to about 7, particularly from about 4.5 to about 5.5, with a pressure greater than 60 psi in the cooking chamber.

Providing a solid powder from a cooked starch can be accomplished by freeze drying or more suitable spray drying.

The molecular weight of suitable starches is generally reduced (converted) from that of the native source to facilitate melting and provide a viscosity of the melted adhesive blend having a viscosity (melt viscosity) in the range of about 10,000 to about 400,000, more suitably from about 50,000 to about 250,000, most suitably from about 50,000 to about 100,000 cps at application temperature; that is at approximately 250–450° F. The viscosity of the melted adhesive blend will depend not only upon the type and amount of starch used, but also upon the type and amount of the plasticizer.

Any method may be used to convert the starch (reduce the molecular weight) including, but not limited to, chemical hydrolysis by the addition of acid or base, enzymatic hydrolysis by the addition of at least one enzyme, oxidized, or dextrinization by the addition of heat. Starches in which repolymerization occurs after dextrinization may also be used.

The starch may also be chemically modified, including esterification or etherification using known methods. If both modification and reduction of molecular weight of the starch are used, they may be accomplished in any order except when the derivative is labile. For a review of the both conversions and chemical modifications see "Starch: Chemistry and Technology", edited by R. L. Whistler et al, Chapter X, 1984.

In particular, corn syrup solids, maltodextrins and amylase-treated starches are used as the starch component of the present invention. Maltodextrins and corn syrup solids with a dextrose equivalent of less than about 35 are preferred. Dextrose equivalent, as used herein, is defined as the reducing power of the hydrolysate. As each starch molecule has one reducing end, DE is inversely related to molecular weight. The DE of anhydrous D-glucose is defined as 100 and the DE of unhydrolyzed starch is virtually zero.

Amylase-treated starches which are first steam cooked, particularly jet cooked, and then converted by a single enzyme, particularly α-amylase, β-amylase, or glucoamylase, to a DE of from about 2 to about 35 and a funnel viscosity of from about 7 to about 80 seconds, are preferred over other amylase-treated starches.

The enzymatic conversion is carried out using techniques known in the art and described, for example, in U.S. Pat. No. 3,525,672 to Wurzburg and U.S. Pat. No. 4,977,252 to Chiu. Generally the enzyme treatment is carried out at a starch concentration level of about 10 to about 40%, particularly from about 20 to about 25%, depending upon the base starch used. The enzyme reaction is continued until the starch is sufficiently degraded to provide a viscosity of from about 7 to about 80 seconds, particularly from about 16 to about 60 seconds, measured at 19% w/w solid concentration at room temperature using a standard funnel method. The resultant product is further characterized by a dextrose equivalent (DE) of 2 to 40.

Funnel viscosity, as used herein, is defined by the following procedure. The starch dispersion to be tested is adjusted to 19% (w/w) measured by refractometer. The temperature of the dispersion is controlled at 22° C. A total of 100 ml of the starch dispersion is measured into a graduated cylinder. It is then poured into a calibrated funnel while using a finger to close the orifice. A small amount is allowed to flow into the graduate to remove any trapped air and the balance is poured back into the funnel. The graduated cylinder in then inverted over the funnel so that the contents draw (flow) into the funnel while the sample is running. Using a timer, the time required for the 100 ml sample to flow through the apex of the funnel is recorded.

The glass portion of the National Starch BF Funnel is a standard 58°, thick-wall, non-fluted, resistance glass funnel in which the top opening diameter is about 9 to about 10 cm with the inside diameter of the stem being about 0.381 cm. The glass stem of the funnel is cut to an approximate length of 2.86 cm from the apex, carefully fire-polished, and refitted with a long stainless steel tip which is about 5.08 cm long with an outside diameter of about 0.9525 cm. The interior diameter of the steel tip is about 0.5952 cm at the upper end where is attached to the glass stem and about 0.4445 cm at the outflow end with the restriction in the width occurring at about 2.54 cm from the ends. The steel tip is attached to the glass funnel by means of a Teflon tube. The funnel is calibrated so as to allow 100 ml of water to go through in six seconds using the above procedure.

Generally, the enzyme conversion will be carried out for a time period ranging from half an hour to 24 hours or more depending upon the temperature of the reaction, the type and concentration of enzyme used, and the starch concentration and viscosity of the reaction slurry. The enzyme reaction is terminated by raising the temperature to about 85° C. and maintaining that temperature for about ten minutes to fully deactivate the enzyme. Acid deactivation, as known in the art, can also be employed to deactivate the enzyme. The amylase-treated starch is then recovered in powdered form by conventional techniques, such as drum-drying or spray-drying.

The polysaccharide may be a single starch or a combination of starches. It is present in an amount from about 10 to about 90, more suitably from about 15 to about 80, most suitably from about 20 to about 70 percent by weight of the starch/crystalline polyol blend.

The crystalline polyol of this invention is defined as being a sugar or sugar alcohols or low molecular weight oligiosaccharides (di-saccharides and tri-saccharides). Examples of suitable crystalline polyols include, but are not limited to, sorbitol, xylitol, trehalose, ribose, raffinose, glucose-hydrate, maltose-monohydrate, fructose, mannitol, lactitol-monohydrate, fructose, glucose, sucrose, maltose. Suitable crystalline polyols will have a melting point below 150° C., most suitably will be a melting point of less than about 110° C. For the purposes of this invention melting point ($T_m$) is defined as the end of the melting peak in the DSC (anhydrous).

The crystalline polyol of this invention can be a single pure material or a blend of two or more polyols. It is also possible to utilize higher melting polyols (greater than 150° C.) by using them in a blend with lower melting polyols, as long as the melting point of the blend is below about 150° C.

The crystalline polyol is present in the powdered adhesive blend in the amount sufficient to cause the powdered adhesive blend to melt in a range of 120–230° C. This will typically be in the range of about 10 to about 90%, more suitably about 20 to 85 and most suitably from about 30 to about 80% by weight based on the dry weight of polysaccharide.

To perform properly the powdered adhesive blend must meet certain requirements. The first is that the blend must melt at or below the application temperature of 230° C. in under less than one minute. By melting we mean the free flowing powder turns into a sticky viscose liquid mass capable of adhering particle to a substrate.

Another requirement of this invention is that the powdered adhesive blend must have no thermal events at or above 150° C. in the first DSC scan.

Additionally, the melted adhesive of this invention should preferably solidify upon cooling to a strong hard material capable of providing good adhesive strength while maintaining crispness of the food article. We have found in order for proper function in this respect the cooled solidified adhesive must have a softening point above room temperature, most suitably above about 40° C. To aid in predicting the ability of the melted formulation to remain crispy after cooling we have found the amount and type of polyol plays an important role. When the polyol (or mixtures of more than one polyol) is used in the most suitable range of about 40 to about 70% the polyol should have a $T_g$ greater than about −5° C. and most suitably greater that about 25° C. The $T_g$ is dependent on the moisture content of the polyol and is very difficult to get and keep these polyols completely anhydrous. Typically crystalline polyols will contain about 3% moisture and that is where the reported $T_g$ measurements were made. The crispiness of the adhesive will only be important in crunchy type foodstuffs (e.g. chips).

The edible hot-melt described herein will find many applications in the food industry, but will be particularly useful in the preparation of low calorie snacks. The hot melt composition may be used to adhere any of a variety of particulate additives, such as flavoring and coloring agents, to foodstuffs by the application of heat.

While the powdered adhesive blend of this invention can be used at almost any level a suitable range for most applications will be from about 10 to about 70%, most suitably form about 20 to about 50% weight of the total seasoning coating.

The application may be a hot food such as one directly out of the oven or deep-fryer, in which case the powdered adhesive blend will melt, adhering the particulate additives such as flavoring and/or coloring agents to the foodstuff. In another embodiment, the application of the powdered adhesive/seasoning mixture may be to a colder food in which case it may be necessary to apply heat, such as by hot air, microwave, ultraviolet or infrared light, to melt the hot melt composition and adhere the particulate additive to the foodstuff. In a third embodiment, the powdered adhesive/seasoning mixture may be melted prior to application.

In the alternative, the powdered adhesive blend may be applied separately from the seasoning. In this alternative, the application may be to a hot food such as one directly out of the oven or deep-fryer, in which case the adhesive blend will melt and then the seasoning is added, adhering to the foodstuff. In another embodiment, the application of the powdered adhesive blend may be added to a colder food in which case it may be necessary to apply heat, such as by hot air, microwave, ultraviolet light or infrared lighting, to melt the hot melt composition and then the seasoning is added, adhering to the foodstuff. In a further embodiment, the powdered adhesive blend may be melted prior to application and after it is applied to the foodstuff, the particulate additive is added and thus adhered.

Flavoring agents include, but are not limited to, salt, cheese powder, sugar, caramel flavoring, chili, Cajun spice, ranch seasoning, and sour cream and onion flavoring. Foods, as used herein, refers to any edible food and includes but is not limited to cereals; biscuits such as crackers and cookies; and snack foods such as pretzels, potato chips, corn chips, popcorn, and peanuts.

One skilled in the art would recognize that other ingredients could be added to the powdered adhesive blend without substantially changing its properties. These could include, but are not limited to, flow enhancers, fillers, binders, preservatives, and stabilizers.

The following examples are offered to further illustrate the present invention, but are in no way meant to limit the scope or spirit. While these examples are targeted for low calorie snack food type products, many other application areas are possible and would be obvious to one skilled in the art.

EXAMPLES

Example 1

Sample Preparation

A total of 100 grams of each blend was prepared by the following general procedure. Each ingredient was sifted through 20 Mesh screen (opening size 850 µm) prior to the blending to eliminate any large lumps. A total of 50 grams of a 5 DE maltodextrin and 50 grams of sorbitol were weighed into a plastic beaker. The powder was mixed by hand using a small spoon and the placed into a coffee grinder. The blend was then intimately mixed in a coffee grinder for 30 seconds at high speed. The mixture was stored in a sealed plastic container for future evaluation. In examples listed in table 1 below, were three components were utilized, all three were blended simultaneously in the coffee grinder. Various blends are listed in table 1, below, with their appropriate melting points.

Adhesive Evaluation:

The powdered adhesive blend as prepared above was mixed with seasoning (bacon bits from McCormick) in equal ratios (on a dry weight basis) and mixed by hand in a beaker. Approximately 20% of the chip weight (e.g. 2 grams of adhesive/seasoning mix for each 10 grams of chips) of the mixture was then sprinkled onto pre-baked (room temperature) tortilla chips. The chips were heated in a Lincoln Impinger® Conveyor Oven (Model 1300) at 150° C. for about 90 seconds or 205° C. for about 45 seconds. Either heating condition could be used and produced virtually the same results. The chips were allowed to cool at room temperature for 5 minutes. The adhesion was tested by measuring the weight of the spice falling off the chips after the chips were brushed 10 times with a 1-inch dry paintbrush. Results of the adhesion test performed at 205° C. for 45 seconds are summarized in table 1, below.

Melting Temperature and Glass Transition Temperature:

The melting temperature (Tm) and the glass transition temperature (Tg) of the samples were determined using DSC. A Perkin-Elmer (Shelton, Conn.) DSC 7 equipped with a CCA 7 temperature controller and a robotic sample handler was used for the measurement. DSC was calibrated using indium and water. Samples were measured using oven solids to determine the total moisture content and about 10 mg (as is moisture content) of sample was weighed into the large volume stainless steel pan with O-ring. The sample was first heated from 10° C. to 180° C. at 10° C./min and held at 180° C. for 10 minutes. Then the sample was quenched to −40° C. and held for 10 minutes. The sample was then rescanned at 10° C./min to 180° C. Duplicate tests were done for each sample, and the average value of the two runs was reported.

TABLE 1

Powdered formulations and adhesion properties (205° C. for 45 sec.).

| Sample # | Composition | Ratio | Moisture % | End $T_m$ (° C.) | Adhesion % |
|---|---|---|---|---|---|
| 1 | 5 DE Maltodextrin/ Sorbitol | 50/50 | 3.8 | 139.2 | 95 |
| 2 | 5 DE Maltodextrin/ Sorbitol | 60/40 | 4.2 | 158.6 | 95 |
| 3 | 5 DE Maltodextrin/ Sorbitol | 70/30 | 5.4 | 156.2 | 93 |
| 4 | 5 DE Maltodextrin/ Sorbitol | 80/20 | 1.8 | 162.4 | <50 |
| 5 | Isomalt | 100 | 0.2 | 155 | N/A |
| 6 | Isomalt/sorbitol | 88/12 | 0.2 | 136 | N/A |
| 7 | 5 DE Maltodextrin/ Sorbitol/Isomalt | 20/10/70 | 3.5 | 138.8 | 92 |
| 8 | Maltose/Sorbitol/ 5 DE Maltodextrin | 20/40/40 | 2.6 | 125.3 | 95 |
| 9 | N-tack/Sorbitol | 50/50 | 3.2 | 91.9 | 99 |
| 10 | N-Tack/Sorbitol/ Maltose | 20/20/60 | 4.9 | 126.0 | 97 |
| 11 | 24 DE corn syrup solids/Sorbitol | 60/40 | 3.5 | 92.1 | 98 |
| 12 | Purity Gum 59/ Sorbitol | 50/50 | 4.9 | 97.3 | 98 |
| 13 | 10 DE Maltodextrin/ Sucrose | 50/50 | 4.9 | 172.8 | <10 |
| 14 | Crystal Tex 627/ Dextrose/ 35 DE corn syrup solids | 40/40/20 | 1.2 | 151.8 | <10 |
| 15 | 10 DE Maltodextrin/ Dextrose | 50/50 | 9.3 | 174.0 | <10 |

Purity Gum 59 = A hydroxypropylated fluidity waxy maize starch from National Starch, Bridgewater, NJ
Crystal Tex 627 = A solution stable tapioca dextrin from National Starch, Bridgewater NJ TABLE 1-continued Powdered formulations and adhesion properties (205° C. for 45 sec.).

| Sample # | Composition | Ratio | Moisture % | End $T_m$ (° C.) | Adhesion % |
|---|---|---|---|---|---|

N-Tack = Corn syrup solids available from National Starch, Bridgewater NJ

As can be seen from the results shown in table 1 above, samples with a melting point of less than 150° C. offer very good adhesion and quick melting as compared to the samples with higher melting points. Sample number 7 illustrate the use of a mixture of high melting/low meting crystalline polyol to obtain acceptable results. All the samples listed in table 1, above, were free flowing powders.

Example 2

Crispiness

The crispiness of the chips was evaluated by tasting test: the crispiness of the seasoned chips was compared against the fresh chips without seasoning/adhesive applied. The seasoned chips were marked as "crispy" only if they were perceived as equal to or better than the control sample. All samples were prepared as described in example 1 and the results of the testing are shown in table 2, below.

TABLE 2

Crispiness of chips vs. $T_g$ of the formulation

| Sample # | Composition | Ratio | Moisture (%) | End $T_g$ (° C.) | Crispiness |
|---|---|---|---|---|---|
| 1 | 5 DE Maltodextrin/ Sorbitol | 50/50 | 3.8 | 5.4 | Chewy |
| 4 | 5 DE Maltodextrin/ Sorbitol | 80/20 | 1.8 | 46.4 | Good |
| 7 | 5 DE Maltodextrin/ Sorbitol/Isomalt | 20/10/70 | 3.5 | 36.0 | Good |
| 9 | N-Tack/Sorbitol | 50/50 | 3.2 | 9.7 | Slightly Chewy |

N-Tack = Corn syrup solids available from National Starch, Bridgewater NJ

As can be seen for the results show in table 2, the crispiness of chips is related to the $T_g$ of the formulation. For applications were crispiness is a desirable property, the formulation should have a $T_g$ of greater than about 10° C. when measured at a moisture content of about 3.0%. One skilled in the are will recognize that moisture acts as a plasticizer and increasing moisture will decrease the $T_g$. It will also be obvious to one skilled in the art that not all applications will require or even desire crispiness in the final product.

The invention claimed is:

1. An edible adhesive blend comprising a polysaccharide and at least one crystalline polyol in which said blend is a free flowing powder, can form a melt at under 205° C. In less than one minute and is substantially free of water, wherein the crystalline polyol has a melting temperature of less than 110° C. and the polyol is present at about 30 to 80% of the polyol/polysaccharide blend.

2. The adhesive of claim 1 in which the polysaccharide is a converted starch.

3. The adhesive of claim 2 in which the converted starch has a DE of between 2 and 35.

4. The adhesive of claim 2 wherein the converted starch is enzyme converted.

5. The adhesive of claim 1, wherein the polysaccharide is an enzyme converted starch with a DE of between 2 and 35.

6. An edible adhesive blend comprising a polysaccharide and at least one crystalline polyol in which said blend is a free flowing powder, can form a melt at under 205° C. in less than one minute and is substantially free of water, wherein the polyol is a blend of two or more sugars or sugar alcohols; the blend having a melting point of less than 150° C. and containing one sugar or sugar alcohol which melts above 150° alone.

7. A process for adhering seasoning to a foodstuff consisting essentially of;

mixing the adhesive of claim 1 with a seasoning, applying the mixture to a food item using substantially no water, heating the food item to at least 120° C. and holding for at least 90 sec., cooling the food item.

8. A process for adhering seasoning to a foodstuff consisting essentially of;

mixing the adhesive of claim 1 with a seasoning, applying the mixture to a food item, heating the food item to at least 120° C. and holding for at least 90 sec., cooling the food item.

* * * * *